Patented Aug. 11, 1953

2,648,646

UNITED STATES PATENT OFFICE 2,648,646

SALT SOLUTIONS OF HIGH ACRYLONITRILE POLYMERS

George W. Stanton, Walnut Creek, and Theodore B. Lefferdink and Thomas C. Spence, Concord, Calif., assignors to The Dow Chemical Company, Midland, Mich., a corporation of Delaware No Drawing. Application May 28, 1951, Serial No. 228,751

10 Claims. (Cl. 260—29.6)

This invention relates to improved solutions of polymers having a high acrylonitrile content, and especially of the linear polymer and copolymers of acrylonitrile containing over 85 per cent of acrylonitrile.

It is recognized that polyacrylonitrile and copolymers containing 85 per cent or more of this material in the polymer molecule are difficultly soluble or substantially insoluble in most common solvents. Because of the interesting and useful properties of such polymeric bodies, however, it is desirable that a means be found to dissolve them readily so as to make solutions suitable for use in spinning fibers of the high acrylonitrile polymers. It has been proposed to use for this purpose any of several types of organic solvents containing amide, nitrile, sulfone, or various other characteristic groups (U. S. 2,404,713 to 2,404,728), but these solvents, in the main, are expensive, difficult to handle or to recover, and require special apparatus for their practical utilization.

It is taught by Dr. Herbert Rein, in U. S. 2,140,921 and British 459,596, that various polymeric vinyl compounds may be dissolved at temperatures near 100° C. in concentrated brines of highly hydrated metal salts of metals of groups I, II and III of the periodic table, which salts are capable of forming aqueous solutions of at least 50 per cent strength at room temperature. The chlorides, bromides, iodides, thiocyanates, perchlorates and nitrates of sodium, lithium, aluminum, calcium, zinc and cadmium are indicated to be especially useful in dissolving such polymers as polyacrylonitrile, polyvinyl formal or butyral, the polymeric acrylic acid esters, copolymers of acrylonitrile with vinyl chloride or with an acrylic acid ester, and the like, at elevated temperatures. In examples dealing with polyacrylonitrile, Rein employed salt solutions of at least 67 per cent concentration.

It is reported by Latham, Houtz and others in most of the patents in the consecutively numbered series from U. S. 2,404,713 to 2,404,728, by Hare in U. S. 2,467,553, by Dickey et al. in U. S. 2,487,859, and in British specifications 583,939 and 584,548, that it is substantially impossible to use the salt solutions suggested by Rein for making useful fibers or films of polyacrylonitrile, because of the poor properties of the spun and coagulated product. It has been found that while each of the salts suggested by Rein may be a solvent for one or more of the suggested polyvinyl compounds at elevated temperatures, by no means all of them are capable of dissolving polymeric bodies containing 85 per cent or more of acrylonitrile. It has also been found that many of the salts proposed by Rein are not capable of forming useful solutions of the polymers here concerned at temperatures below 50° C., and down to the more practical or desirable working temperatures of 0° to 45° C. In view of the economies which are theoretically possible through the use of salt solutions rather than organic solvents in forming spinning solutions of polymers rich in acrylonitrile, it would be desirable to provide such a solution having a practical, or "spinnable" viscosity and concentration of polymer at moderate temperatures, for example, from 0° to 45° C.

It is accordingly an object of the present invention to provide an aqueous saline solution of a polymeric body containing at least 85 per cent acrylonitrile in the polymer molecule, which solution is capable of being spun at moderate temperatures, ranging upward from 0° C., into a coagulating bath to form useful, strong filaments or films. A related object is to provide such a solution containing a practical concentration of polyacrylonitrile at or near room temperature, from which fine fibers may be spun readily of a quality suitable for use in the textile industry. Other and related objects may appear hereinafter.

It has been found that polymers containing 85 per cent or more acrylonitrile are soluble to varying degrees and at temperatures which may range up to 110° C. or higher in aqueous brines containing generally 65 per cent of zinc chloride, stannic chloride, lithium bromide, antimony pentachloride, sodium thiocyanate, nickel nitrate, or the like, but that such solutions have too high a viscosity to spin easily if they contain enough polymer of the preferred molecular weight to be practical, and that they give difficultly coagulable spun products with little strength if the concentration of polymer is kept low enough to facilitate flow of the solution through a spinneret. It has also been found that aqueous brines of such salts as calcium chloride, magnesium chloride, aluminum chloride, sodium chloride, and the corresponding nitrates and sulfates are incapable of dissolving polymeric bodies containing 85 per cent or more of acrylonitrile at any temperature below 50° C., and that some of them are non-solvents even up to 100° C.

The better to define the "solvent" and "non-solvent" salts, a table of cations is given below, in the approximate order of their effectiveness in dissolving the polymers here concerned. A companion list of anions, completing the lyotropic series, is also presented.

TABLE

*Lyotropic series for polyacrylonitrile*

| Cations in Increasing Order of Effectiveness | Anions in Decreasing Order of Effectiveness |
|---|---|
| K$^+$ | |
| Fe$^{+++}$ | |
| Pb$^{++}$ | |
| NH$_4^+$ | |
| Cd$^{++}$ | SCN$^-$ |
| Al$^{+++}$ | |
| Na$^+$ | I$^-$ |
| Ba$^{++}$ | |
| Ca$^{++}$ | |
| Li$^+$ | Br$^-$ |
| Mg$^{++}$ | |
| Ga$^{+++}$ | |
| Sb$^{+++}$ | |
| In$^{+++}$ | Cl$^-$ |
| Tl$^{+++}$ | |
| Sn$^{++++}$ | |
| Zn$^{++}$ | |
| Ag$^+$ | |
| Ni$^{++}$ | NO$_3^-$ |
| Co$^{++}$ | |
| Mn$^{++}$ | |
| | SO$_4^-$ |

Thus, of the cations listed, potassium and ferric salts are the least effective solvents, regardless of their associated anions, and, of the anions listed, the sulfates are the least effective solvents, regardless of their associated cations. Each listed cation forms a "solvent salt" with the anions at equal or higher levels in the table, and forms non-solvent salts with anions lower in the table. Thus, no sulfate of a tested metal has been found to dissolve the polymer. No nitrate of a metal above the group containing silver and zinc has been found effective. No chloride of a metal above the group containing tin is effective, but the chlorides of antimony, zinc, nickel, cobalt and manganese serve as solvent salts. No bromide of a metal above calcium is a solvent for the polymer, but the water-soluble bromides of the metals below calcium are all solvents. The highly soluble iodides of all metals below sodium and the soluble thiocyanates of all the listed metal cations except the potassium, ferric, and plumbous ions, are "solvents." The materials employed in the present invention, either as "solvent" or as "non-solvent" salts, must be readily soluble in water and the solvent and non-solvent salt constituents of the system must be capable of remaining dissolved when both are present in the same aqueous medium. Thus, silver nitrate cannot be used with any halide or thiocyanate, and no sulfate can be used together with a calcium salt, for example. In the foregoing table, the cations in each group, the groups being divided by horizontal lines, are of approximately equal effectiveness, all members of the groups level with or below the thiocyanate anion forming salts (with anions at the same or higher level in the table) that are better solvents for the polymer than are the corresponding salts of cations in any higher group.

The present invention is based on the surprising discovery that high acrylonitrile polymers may be dissolved at moderate temperatures, and that tough fibers or films may be made from such solutions, in an aqueous mixed brine containing a solvent salt at a concentration of at least 30 per cent which is insufficient to dissolve the polymer, and a lesser amount of a non-solvent salt forming at least 5 but not over 25 per cent of the solution, the aggregate concentration of both salts being at least 55 per cent. In no case does the aggregate amount of the two salts in solution need to exceed 65 per cent in order to dissolve the polymer, and in most instances a total of 57 to 62 per cent of the two salts is satisfactory. In at least a part of the operative range of proportions, the presence of the non-solvent salt gives polymer solutions of lower viscosity than solutions of the same polymer at the same concentration in a brine containing only the solvent salt. When fibers or other shaped bodies are formed by wet spinning a solution of the polymer in the mixed brine, conforming to the present invention, the polymer is coagulated in a form which is easier to work, and better products may be obtained than when the single salts of the prior art are employed.

Of the many salts listed in the foregoing table, the ones preferred for use in the invention are stannic chloride and the chlorides and nitrates of zinc, nickel, cobalt and manganese, as the solvent salts, and the chlorides and nitrates of magnesium, calcium, aluminum and sodium as the non-solvent salts. It is preferred that both salts in each mixed brine have the same anion, though this is not a necessary condition. For economy and maximum satisfaction, a mixed salt solution which is preferred for use in the invention is one containing zinc chloride as the solvent salt and calcium or magnesium chloride as the non-solvent salt.

The solution of a high acrylonitrile polymer in one of the defined mixed salt brines may be prepared by stirring the polymer, preferably in finely divided form, into the brine at a temperature which need not exceed 45° C., and allowing the resulting composition to stand with occasional stirring until the polymer has swollen and dissolved. Another and most convenient way of making the solution is to dissolve monomeric acrylonitrile, with or without a modifying comonomer, in the aqueous solution of mixed salts, at a temperature commonly near 30° C., and causing the polymer or copolymer to form in solution, as is more fully described in a concurrently filed application of two of the present inventors and another, Serial No. 228,752.

The following example illustrates the advantages of the present invention. Samples of the same polyacrylonitrile, molecular weight 45,000, were dissolved to make 4 per cent solutions by weight in each of several brine systems. Some of the brines contained only solvent salts, and the rest contained mixtures of solvent and non-solvent salts. Each solution was used to spin fibers under the same conditions. The fibers were coagulated in ice water, stretched cold to the maximum possible extent without rupture, soaked for 10 to 15 minutes in ice water to extract residual salt, and hot stretched at 100° C. to the maximum possible extent without rupture.

The resulting fibers had the properties reported in the following table.

TABLE

| Salt | | Salt Concentration (Percent in Water) | | Viscosity of Polymer Solution (Poise) at 30° C. | Fiber Properties | | |
|---|---|---|---|---|---|---|---|
| Solvent | Non-Solvent | Solvent | Non-Solvent | | Tenacity (gm./denier) | Ultimate Elongation, per cent | Toughness Index (ergs/denier cm.) |
| $ZnCl_2$ | ------ | 60 | ------ | 78 | 1.6 | 24 | 190 |
| $ZnCl_2$ | ------ | 35 | ------ | 215 | <0.6 | <20 | <60 |
| $SnCl_4$ | ------ | 25 | ------ | | | | |
| $ZnCl_2$ | $CaCl_2$ | 35 | 25 | 118 | 2.5 | 50 | 613 |
| $ZnCl_2$ | $CaCl_2$ | 45 | 15 | 41 | 3.8 | 45 | 840 |
| $ZnCl_2$ | $MgCl_2$ | 45 | 15 | 42 | 3.5 | 65 | 1,110 |

It is noted that each solution of the polymer in the mixed brines of the present invention gave strong and tough fibers which were superior to those obtained from solutions in solvent salts alone. Some of the solutions in the mixed brines had much lower viscosities than those in the solvent salts alone. This is further illustrated in the following table which shows that the same polymer may be dissolved in a mixed salt to form more concentrated solutions, without exceeding a practical viscosity, than in a single salt.

| Salt Composition | | Polymer in solution, Wt. per cent | Viscosity of polymer solution, poises |
|---|---|---|---|
| $ZnCl_2$ | $CaCl_2$ | | |
| 60 | ------ | 7.1 | 4,480 |
| 35.2 | 25.8 | 8.6 | 1,280 |
| 35.2 | 25.8 | 10.6 | 4,480 |

The example showed the application of the invention in the solution of polyacrylonitrile. The invention is applicable as well to the solution of copolymers of 85 per cent or more acrylonitrile and up to 15 per cent of such copolymerized constituents as allyl alcohol, vinyl acetate, allyl amine, acrylamide, methacrylamide, vinyl pyridine, methyl acrylate, and similar monoethylenically unsaturated polymerizable compounds.

The mixed salt solutions herein described have been used to dissolve high acrylonitrile polymers with molecular weights as high as 4,000,000, although, for the manufacture of textile fibers it is preferred to employ solutions of such polymers in the molecular weight range between 10,000 and 50,000, as determined by the equation published by Houtz, Textile Research Journal, 20, 786 (1950).

$$[\eta] = 1.75 \times 10^{-3} \times M^{0.66}$$

where $\eta$ is the intrinsic viscosity and M is molecular weight.

It is to be understood that the salts, water and polymer are the essential constituents of the new compositions, but that dyes, pigments, fillers, plasticizers or other modifiers may be present as well.

We claim:

1. A new composition of matter comprising, as the essential constituents, a solution of a polymer selected from the group consisting of polyacrylonitrile and copolymers of at least 85 per cent acrylonitrile and up to 15 per cent of another vinyl compound, in an aqueous solution of at least 30 per cent based on the total weights of salts and water in said solution, but less than a concentration which will dissolve the polymer, of a salt having an anion at least as high in the appended lyotropic series of solvents for the polymer as its cation, and lesser amount, between 5 and 25 per cent, of a salt having an anion lower in the said lyotropic series than its cation and being mutually soluble in water with the other said salt, the total concentration of the salts in said aqueous solution being at least 55 per cent by weight; said lyotropic series of solvents for the polymer being:

| Cations in Increasing Order of Effectiveness | Anions in Decreasing Order of Effectiveness |
|---|---|
| $K^+$ | |
| $Fe^{+++}$ | |
| $Pb^{++}$ | |
| $NH_4^+$ | |
| $Cd^{++}$ | $SCN^-$ |
| $Al^{+++}$ | |
| $Na^+$ | |
| $Ba^{++}$ | $I^-$ |
| $Ca^{++}$ | |
| $Li^+$ | $Br^-$ |
| $Mg^{++}$ | |
| $Ga^{+++}$ | |
| $Sb^{+++}$ | |
| $In^{+++}$ | $Cl^-$ |
| $Tl^{+++}$ | |
| $Sn^{++++}$ | |
| $Zn^{++}$ | |
| $Ag^+$ | |
| $Ni^{++}$ | $NO_3^-$ |
| $Co^{++}$ | |
| $Mn^{++}$ | $SO_4^-$ |

2. A solution comprising, as the essential constituents, polyacrylonitrile dissolved in an aqueous solution of at least 30 per cent based on the total weights of salts and water in said solution, but less than a concentration which will dissolve the polymer, of a salt selected from the group consisting of stannic chloride and the zinc, nickel, cobalt and manganous chlorides and nitrates, and a lesser amount, between 5 and 25 per cent, of a salt selected from the group consisting of magnesium, calcium, aluminum and sodium chlorides and nitrates, the total concentration of the salts in said aqueous solution being at least 55 per cent by weight.

3. The composition claimed in claim 2, wherein both salts have the same anion.

4. A solution comprising, as the essential constituents, polyacrylonitrile dissolved in an aqueous solution of from 30 to 50 per cent zinc chloride and from 5 to 25 per cent of calcium chloride, the aggregate concentration of zinc and calcium chlorides in said aqueous solution being from 55 per cent to 65 per cent by weight.

5. A solution comprising as the essential constituents, polyacrylonitrile dissolved in an aqueous solution of about 45 per cent zinc chloride and about 15 per cent calcium chloride, based on the combined weights of said salts and water.

6. The method of making a solution of high polymers which comprises dissolving at a temperature between 10° C. and 45° C., a polymer selected from the group consisting of polyacrylonitrile and copolymers of at least 85 per cent acrylonitrile and up to 15 per cent of another vinyl compound, in an aqueous solution of at least 30 per cent based on the total weights of salts and water in said solution, but less than a concentration which will dissolve the polymer, of a salt having an anion at least as high in the lyotropic series set forth in claim 1 as its cation, and lesser amount, between 5 and 25 per cent, of a salt having an anion lower in the said lyotropic series than its cation and being mutually soluble in water with the other said salt, the total concentration of the salts in said aqueous solution being at least 55 per cent by weight.

7. The method which comprises dissolving polyacrylonitrile at a temperature between 10° an 45° C. in an aqueous solution of from 30 to 50 per cent zinc chloride and from 5 to 25 per cent of calcium chloride, the aggregate concentration of zinc and calcium chlorides in said aqueous solution being from 55 per cent to 65 per cent by weight.

8. A solution comprising, as the essential constituents, polyacrylonitrile dissolved in an aqueous solution of from 30 to 50 per cent zinc chloride and from 5 to 25 per cent of magnesium chloride, the aggregate concentration of zinc and magnesium chlorides in said aqueous solution being from 55 per cent to 65 per cent by weight.

9. A solution comprising as the essential constituents, polyacrylonitrile dissolved in an aqueous solution of about 45 per cent zinc chloride and about 15 per cent magnesium chloride, based on the combined weights of said salts and water.

10. The method which comprises dissolving polyacrylonitrile at a temperature between 10° and 45° C. in an aqueous solution of from 30 to 50 per cent zinc chloride and from 5 to 25 per cent of magnesium chloride, the aggregate concentration of zinc and magnesium chlorides in said aqueous solution being from 55 per cent to 65 per cent by weight.

GEORGE W. STANTON.
THEODORE B. LEFFERDINK.
THOMAS C. SPENCE.

References Cited in the file of this patent

UNITED STATES PATENTS

| Number | Name | Date |
|---|---|---|
| 2,425,192 | Kropa | Aug. 5, 1947 |

OTHER REFERENCES

Hackh's Chemical Dictionary, 3d edition, page 503.